No. 727,641. PATENTED MAY 12, 1903.
E. KNOWLTON.
MAGNETIC CLUTCH.
APPLICATION FILED OCT. 3, 1902.
NO MODEL.
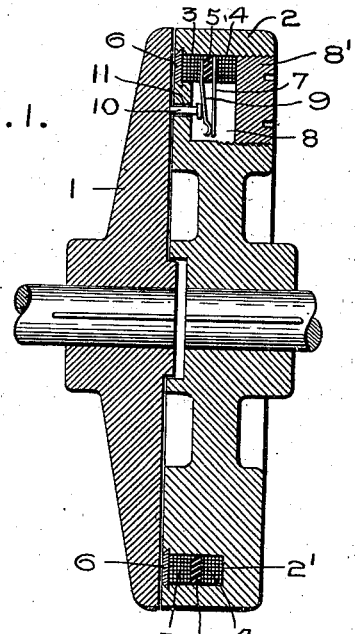
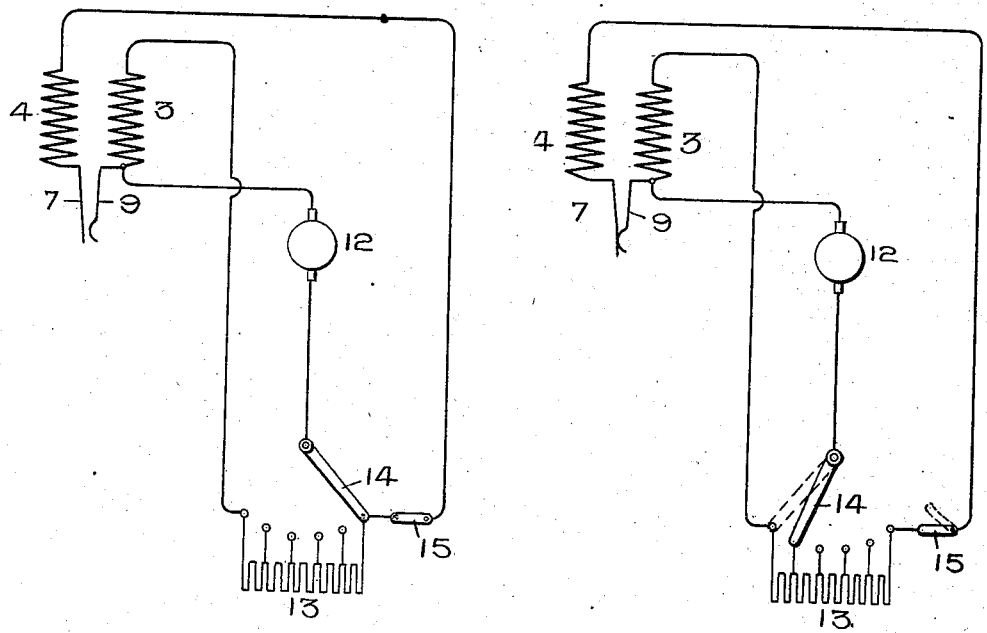
Witnesses:
Marcus L. Byng.
Helen Orford
Inventor:
Edgar Knowlton,
by Albert H. Davis
Att'y.

No. 727,641. Patented May 12, 1903.

UNITED STATES PATENT OFFICE.

EDGAR KNOWLTON, OF SCHENECTADY, NEW YORK, ASSIGNOR TO GENERAL ELECTRIC COMPANY, A CORPORATION OF NEW YORK.

MAGNETIC CLUTCH.

SPECIFICATION forming part of Letters Patent No. 727,641, dated May 12, 1903.

Application filed October 3, 1902. Serial No. 125,811. (No model.)

*To all whom it may concern:*

Be it known that I, EDGAR KNOWLTON, a citizen of the United States, residing at Schenectady, county of Schenectady, State of New York, have invented certain new and useful Improvements in Magnetic Clutches, of which the following is a specification.

One of the difficulties experienced in the operation of magnetic clutches is due to the fact that the current which it is necessary to employ in the magnetizing-coils in order to draw the clutch members together is sufficient to cause the members to lock together rigidly when brought in contact, owing to the large decrease in the reluctance of the magnetic circuit which takes place when the opposing clutch members contact. When one of the members is running and it is desired to couple the other member to it, this sudden locking is quite objectionable, as it produces a jar both on the machinery which is being set in motion and on the mechanism which is coupled to or which drives the member already in motion. This is especially objectionable where synchronous motors are employed for driving the power-shaft, as the jar tends to throw them out of step. To avoid this difficulty, I have provided means for reducing the magnetizing force at the instant the clutch members contact with one another. One of the means which I have employed for this purpose comprises a pair of magnetizing-coils, one of which is employed to draw the two members together and the other of which is normally open-circuited, but is arranged to have its circuit completed automatically upon the contacting of the two clutch members. This second coil is so constructed that its magnetizing action is opposed to that of the first coil. The effect, therefore, of the use of the two coils is to produce a sudden decrease in the magnetizing force when the two clutch members come together, so that the sudden decrease in magnetic reluctance which takes place at that instant is accompanied by a decrease in magnetizing force. After the members have come together the magnetizing force, and hence the force with which the clutch members engage one another, can be varied by the manipulation of a rheostat placed in circuit with one of the magnetizing-coils. At or before the instant at which the two clutch members are rigidly locked together one of the coils may be open-circuited.

I have illustrated one embodiment of my invention in the accompanying drawings, in which—

Figure 1 is a sectional elevation, and Figs. 2 and 3 are diagrammatical views showing the circuits of the magnetizing-coils with different positions of the switch members.

The clutch shown is of the usual form and contains two opposing disk-shaped members 1 and 2, of magnetic material. These members are secured at the ends of the shafts, one of which is the driven shaft and the other the driving-shaft. The member 2 is provided with an annular recess 2' near its periphery, in which are placed two magnetizing-coils 3 and 4, which are separated by a layer of insulation 5. These coils are held in place by a layer of Babbitt or similar metal 6. Grooves are formed in the side walls of the recess, into which the Babbitt metal can run, as is clearly shown in Fig. 1. A spring-finger 7, which forms one terminal of the coil 4, projects into a recess 8, formed for the purpose in the member 2 and which opens into the recess 2'. Another spring blade or finger 9, also located in the recess 8 adjacent to the first spring-finger and separated therefrom by the insulation-strip 5, is connected to one of the terminals of the coil 3. A sliding bolt 10, mounted in a recess 11 on the front face of the member 2 and extending through into the recess 8, with its head against the spring-finger 9, is so proportioned as to force the fingers or blades 7 and 9 into engagement with one another when the member 1 contacts with the member 2. The walls of the recess 8 are threaded to receive the screw-plug 8', which may be removed to obtain access to the switch-fingers 7 and 9. The resiliency of the finger 9 is sufficient to cause it to disengage itself from the finger 7 and to move the bolt 10 outward when the members 1 and 2 disengage.

Referring to the diagram, 12 represents a source of current-supply for the magnetizing-coils, 13 a rheostat of the usual construction, and 14 the switch-arm of the rheostat. A switch 15 is placed in the line leading to one of the terminals of the coil 4.

I have not thought it necessary to illustrate the electrical connections between the coils and the switches and source of current-supply, as these are details of construction which will be understood by any one skilled in the art.

In operation the switch 15 is closed first, and then the switch 14 is turned to close the circuit from the coil 3 and the source of current 12. This will usually cause enough current to pass through the coil 3 to draw the members 1 and 2 into contact with one another. In case, however, current which passes is insufficient for this purpose more resistance may be cut out of the rheostat 13 until the magnetizing force due to the current in the coil 3 is sufficient to draw the members together. At the instant at which the members 1 and 2 come together the bolt 10 is forced to the right, as shown in Fig. 1, which in turn forces the finger 9 from the position shown in Fig. 2 into contact with the finger 7, as shown in Fig. 3, thus cutting in the coil 4. As the coil 4 is so arranged that its action opposes that of the coil 3, the magnetizing force is suddenly reduced by cutting it in.

The coils 3 and 4 will usually be so proportioned that the magnetizing force due to the joint action of the coils is merely reduced from that of the coil 3 alone and not reversed in direction. More of the resistance of the circuit in which the coil 3 is placed may now be cut out, and the amount of slipping and the time at which the members are rigidly locked together will be governed by the operation of the rheostat. When the switch-lever 14 is moved to the extreme left, as shown by the dotted position in Fig. 3, the switch 15 may be opened either automatically by a proper mechanical connection with the switch-arm 14 or manually by the operator. The advantages due to my construction will be readily appreciated by those skilled in the art.

While I have illustrated and described the best form of my invention which is now known to me, I do not intend to be limited to the exact details of construction or arrangement which I have here shown, and it will be understood that modifications may be made without departing from the spirit of my invention.

What I claim as new, and desire to secure by Letters Patent of the United States, is—

1. In a magnetic clutch, a pair of clutch members, means for drawing them together, a magnetizing-coil for said members normally open-circuited, and automatic means for closing the circuit of said coil when the clutch members are drawn together.

2. In a magnetic clutch, a clutch member having a recess formed in its face, a pair of magnetizing-coils mounted in said recess, and a switch also mounted in said recess for connecting the two coils together.

3. In a magnetic clutch, a pair of opposed disk members adapted to be moved into and out of engagement with one another, a pair of magnetizing-coils carried by one of said clutch members, a switch for connecting said coils, and automatic means for operating said switch when said clutch members engage one another.

4. In a magnetic clutch, a pair of opposed disk clutch members, one of said clutch members being provided with a recess, a pair of magnetizing-coils mounted in said recess, a switch for connecting said coils also mounted in said recess, a switch-actuating member normally projecting from the face of said clutch member in a position to be engaged by the other clutch member when the two clutch members are brought into contact with one another.

5. In a magnetic clutch, a pair of clutch members adapted to be drawn together and separated, a magnetizing-coil, a second magnetizing-coil so wound as to oppose the first-mentioned coil, and means for closing the circuit through the second coil when the clutch members are drawn together.

6. In a magnetic clutch, a pair of clutch members, a pair of magnetizing-coils therefor, means for supplying current to one of said coils to produce a magnetic flux through said members in one direction to draw said clutch members together, automatic means acting at the instant at which the clutch members are drawn together for producing a flow of current in the other coil tending to produce a flux in the opposite direction.

7. In a clutch, a pair of clutch members formed of magnetic material, said clutch members being rotatably and longitudinally movable with respect to one another, means for causing a magnetizing force to operate upon said members to draw them together, and means for automatically reducing the magnetizing force when the clutch members come together.

8. In a clutch, a pair of clutch members of magnetic material rotatably and longitudinally movable with respect to one another, a pair of normally open-circuited magnetizing-coils therefor, manual means for closing the circuit of one of said coils to move said members together, and automatic means for closing the circuit of the other coil at the instant at which the members are drawn together.

9. In a magnetic clutch, a pair of clutch members adapted to be drawn together and separated, means for producing a magnetic flux for drawing said members together, and means for preventing an objectionable increase in said flux when the clutch members come together.

In witness whereof I have hereunto set my hand this 2d day of October, 1902.

EDGAR KNOWLTON.

Witnesses:
 BENJAMIN B. HULL,
 HELEN ORFORD.